United States Patent [19]

Lester

[11] Patent Number: 5,036,312

[45] Date of Patent: Jul. 30, 1991

[54] SPRING FAILURE DETECTION AND SAFETY SYSTEM

[75] Inventor: Theodore V. Lester, Schiller Park, Ill.

[73] Assignee: Motorola, Inc., Schaumburg, Ill.

[21] Appl. No.: 293,036

[22] Filed: Jan. 3, 1989

[51] Int. Cl.[5] ........................ G08B 21/00; F16F 1/00

[52] U.S. Cl. ........................ 340/679; 73/161; 267/182; 324/691

[58] Field of Search ........................ 340/679, 508, 438; 73/161, 862.68; 324/65 R, 65 CR, 691, 693, 701; 267/182; 338/2, 13, 47, 98, 114, 218, 267, 278, 282, 296, 333–334

[56] References Cited

U.S. PATENT DOCUMENTS

| | | | |
|---|---|---|---|
| 3,833,094 | 9/1974 | Grossman | 340/438 X |
| 4,086,557 | 4/1978 | Padgitt et al. | 338/42 |
| 4,086,809 | 5/1978 | Wu et al. | 73/161 |
| 4,278,120 | 7/1981 | Hart et al. | 411/190 |
| 4,355,293 | 10/1982 | Driscoll | 338/184 |
| 4,458,234 | 7/1984 | Brisard | 340/438 |
| 4,517,832 | 5/1985 | Holland et al. | 340/438 X |
| 4,550,286 | 10/1985 | Holland et al. | 340/438 X |
| 4,797,662 | 1/1989 | Graham et al. | 340/679 X |
| 4,850,319 | 7/1989 | Imoehl | 123/361 |

*Primary Examiner*—Glen R. Swann, III
*Assistant Examiner*—Thomas J. Mullen, Jr.
*Attorney, Agent, or Firm*—Phillip H. Melamed

[57] ABSTRACT

A spring failure detection and safety system comprising detection devices for continuously monitoring the life of a spring, and detecting and signalling its imminent or actual failure. The system also may comprise warning devices that have sensory outputs capable of informing a human operator of a spring failure. It may also comprise a memory device that would receive and store the failure detection signal, for example, for the purpose of informing maintenance personnel of the failure, or to serve as part of a test or failure evaluation system. The invention may also comprise a safety feature consisting of one or more springs to operate redundantly with the first spring, to protect against spring failure.

12 Claims, 1 Drawing Sheet

SPRING FAILURE DETECTION AND SAFETY SYSTEM

TECHNICAL FIELD

This invention relates to any application of a spring in which the failure of the spring is an important condition to detect and protect against.

BACKGROUND ART

Springs are used in a wide variety of applications, including control, closure, dampening and support, among others. They are also used in a wide variety of environments, many of which may be damaging to spring life. Problems may arise when a spring fails in the course of performing its function. This is particularly critical when the spring is used in a way in which its continued ability to perform its function is important to protect life or property against loss, injury or damage. For example, catastrophic consequences can occur if an automobile goes out of control as a result of the failure of a throttle return spring.

Thus, in critical applications (and, indeed, in any application), it may be extremely useful to monitor the life of the spring and to initiate a warning signal in the event of its failure. Moreover, it may also be useful to protect against such failures and to record and store the event of a failure in some form of memory. This would help protect life or property, and could also be used for maintenance or test purposes or otherwise to reconstruct the reason for a failure. Such a system would be particularly useful for a spring used in a hostile environment such as an engine compartment or vehicular suspension system, where spring life may be impacted adversely by one or more factors including extremes in usage, vibration, temperature, corrosion and the like, any one or more of which may occur throughout the period of its operation.

A need therefore exists for a device or system of devices that is capable of monitoring spring life, detecting and signalling spring failure and/or recording and storing the event of such failure in memory, and safeguarding against it.

SUMMARY OF THE INVENTION

These needs are substantially met through provision of the spring failure detection and safety system disclosed herein. This system includes devices for monitoring spring life, detecting spring failure, automatically signalling the same and/or recording and storing the event of such failure in memory, and safeguarding against it.

Briefly, the invention provides a spring used in any application, one end of which is coupled to an electrical power source and the other end to a detection device, in such a way as to form an electrical circuit. In the event that the spring breaks, the circuit would be interrupted and the break in the spring detected by the detection device. A failure detection signal then would automatically be sent by the detection device. Thus, the spring would be monitored continuously for failure by breakage.

The invention may further provide warning devices that respond to the failure detection signal. These could consist of one or more devices emitting an audio or visual signal, or other sensory signal, and/or input to a memory device such as an engine control computer. The sound or light could notify an operator. The memory input could notify anyone analyzing the computer memory, such as maintenance personnel.

The invention may further include the connection of one or more springs with the first spring, such as in parallel with it, to act redundantly with the first spring. This would add a measure of safety to the operation of the first spring. If the first spring breaks, its function would continue to be performed by the additional spring or springs.

The invention may further couple all of the springs electrically in series, so that a circuit is created between the power source and the failure detection device. Breakage of one or more of the springs would interrupt the circuit and again automatically initiate the failure detection signal, which could activate the warning device and/or input to memory, as described above.

Another embodiment of the invention would include a means to detect imminent spring failure, versus actual spring failure, due to causes that would affect ohmic resistance. For example, the imminent failure of the spring or springs by virtue of corrosion, rather than actual failure by breakage, could be detected by monitoring the ohmic resistance of the spring or springs. Changes in said resistance, beyond a predetermined factor, would automatically initiate the failure detection signal, which again could activate the warning device and/or input to memory, as described above.

BEST MODE FOR CARRYING OUT THE INVENTION

Figure 1:
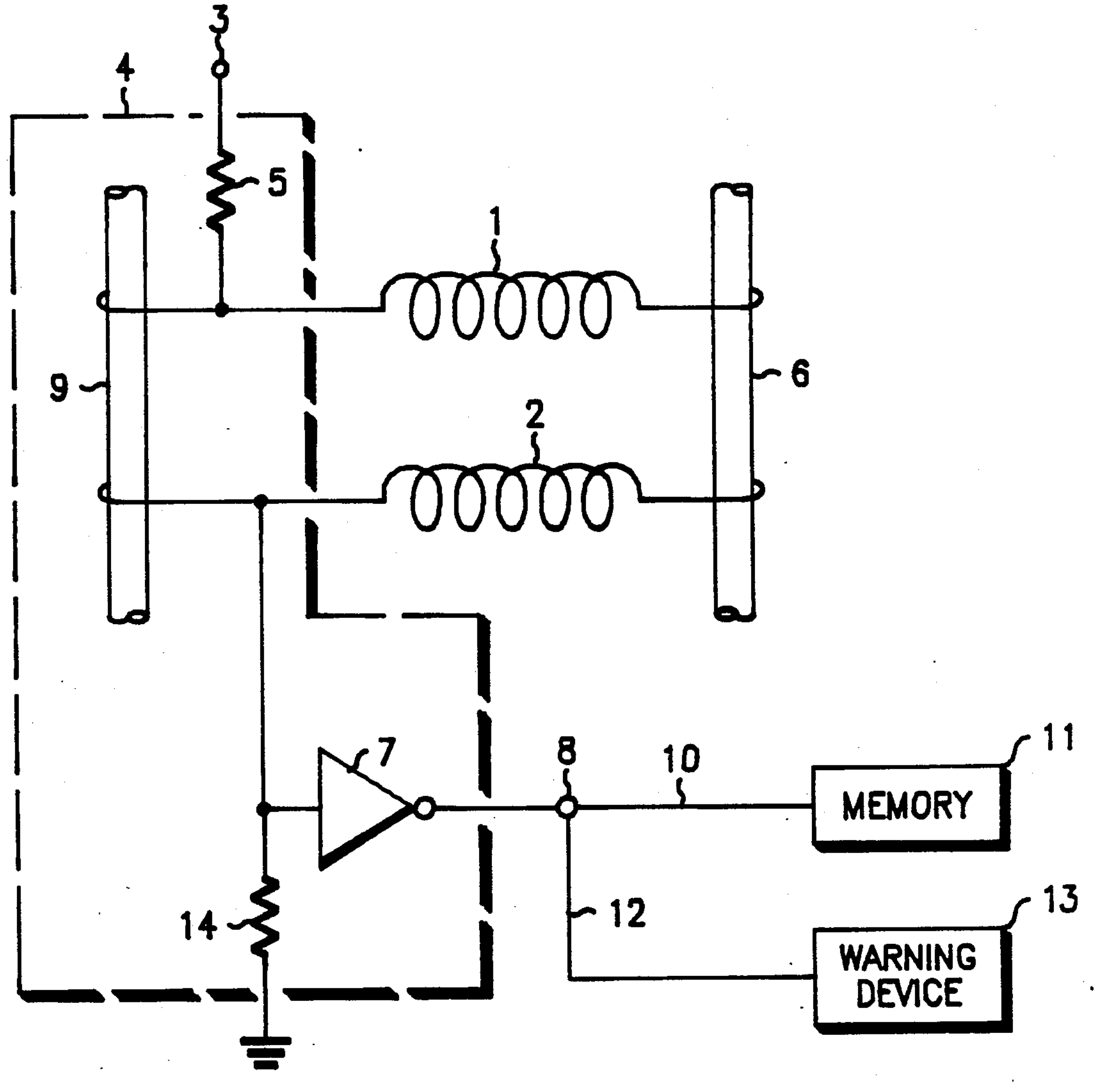
FIG. 1 comprises a block diagram depiction of the invention.

Referring to FIG. 1, the invention, in this embodiment, includes a first coil spring (1), a second coil spring (2), and a power source (3), all coupled electronically in series to form an electrical circuit. The spring failure detection device (4) consists of a resistor (5) that couples at one end to the power source (3) and at its remaining end to one end of the first coil spring (1). The remaining end of the first coil spring (1) is mechanically and electrically linked to a conductive member (6), which also functions to support one end of the second coil spring (2). In this way, the two coil springs (1 and 2) are electrically coupled in series. The remaining end of the second coil spring (2) couples to the input of a buffer/inverter (7), the output of which (8) may be coupled as appropriate to provide a warning signal and/or output (8) to a memory device, as discussed in more detail below.

Important to this embodiment, one end of the springs (1 and 2) are coupled to an insulator member (9) to insure that, though the springs are mechanically coupled in parallel, they remain electrically coupled in series.

In the event that either or both springs break, the electrical circuit would be interrupted and the output (8) of the detection device (4) would automatically provide a failure detection signal. The invention in this embodiment also includes a warning device (13) responsive to the failure detection signal. The warning device in this embodiment could be an appropriate audio or visual signal, such as a horn, bell, light or gauge, and/or other sensory signalling device, such as a vibration device. The invention also contemplates that the failure detection signal could be sent to a memory device (11) to be recorded for storage and recall.

Figure 2:
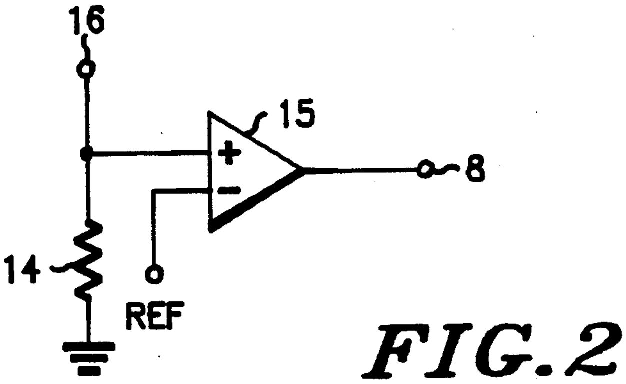
FIG. 2 comprises a block diagram depicting a portion of another embodiment of the invention.

Referring to FIG. 2, the invention in this embodiment includes a failure detection device (4) that not only would detect spring breakage, as described above, but also would detect the imminent failure of a spring due to corrosion or other defect that would change its ohmic resistance. This device would monitor the omhic resistance value of the spring and compare it to a fixed reference value (Ref). If the monitored value (16) should depart from the reference value, by a preselected factor, the output (8) of the detection device (4) would automatically provide a failure detection signal. The invention in this embodiment also includes a warning device (13) and memory device (11), as described above.

I claim:

1. A spring failure detection device comprising:

(A) detection means for detecting a failure in anyone spring; and (B) output means responsive to said detection means for automatically providing a failure detection signal, and a spring and a redundant spring connected in a manner such that either spring performs the same function.

2. A spring failure detection device comprising:

(A) detection means for detecting a failure in a spring;

(B) output means responsive to said detection means for automatically providing a failure detection signal, and a memory means coupled to the output means responsive to said failure detection signal for recording and storing such signal.

3. A spring failure detection device comprising:

(A) detection means for detecting a failure in a spring; and (B) output means responsive to said detection means for automatically providing a failure detection signal, wherein said detection means monitors the ohmic resistance value of the spring so as to detect spring failure due to a defect that changes the ohmic resistance of the spring.

4. A spring failure detection and safety device, comprising:

(A) at least one redundant spring operably coupled with respect to a spring;

(B) detection means for detecting a failure of any one of said springs; and (C) output means responsive to said detection means for automatically providing a failure detection signal.

5. A spring failure detection and safety device according to claim 4, further including warning means responsive to said output means for providing a warning of a failure of at least one of said springs.

6. A spring failure detection and safety device according to claim 4, which further includes a memory means coupled to said output means for recording and storing said failure detection signal.

7. A spring failure detection and safety device according to claim 4, which further includes a means for measuring the ohmic resistance value of at least one of said springs so as to detect spring failure due to a defect that changes the ohmic resistance of said spring.

8. A coil spring failure detection and safety device, said device comprising:

(A) a coil spring;

(B) a redundant coil spring;

(C) first means for detecting a failure of any one of said springs; and (D) second means responsive to said first means for warning of a detected failure.

9. A spring failure detection and safety device according to claim 8, wherein said first means detects as a failure a defect in at least one spring as a result of a change in the ohmic resistance of said spring.

10. A coil spring failure detection device, comprising:

(A) a coil spring coupled mechanically between two points to perform a function;

(B) at least one redundant coil spring coupled mechanically to perform said function wherein the two springs are coupled electronically in series;

(C) first means for detecting the failure of at least one of the springs; and (D) second means responsive to said first means for automatically providing a signal warning of any detected failure of a spring.

11. A coil spring failure detection and safety device according to claim 10 which further includes a third means responsive to said second means for recording and storing said warning signal in a memory device.

12. A coil spring failure detection and safety device according to claim 10, wherein said first means detects as a failure a defect in at least one spring as a result of a change in the ohmic resistance of said spring.

* * * * *